United States Patent [19]
Haller et al.

[11] Patent Number: 5,953,970
[45] Date of Patent: Sep. 21, 1999

[54] ELECTRONICALLY PROGRAMMABLE SERVO-CONTROLLED POWER FEED AND SPINDLE DRIVE SYSTEM FOR AN AUTOMATIC SCREW MACHINE

[75] Inventors: Dennis A. Haller, Washington Township; John J. Saputo, Clinton Township, both of Mich.

[73] Assignee: Ski Industries, Inc., Shelby Township, Mich.

[21] Appl. No.: 09/057,302

[22] Filed: Apr. 8, 1998

[51] Int. Cl.⁶ .................................................. B23B 13/04
[52] U.S. Cl. ............................... 82/129; 82/133; 82/118; 82/144
[58] Field of Search ............................. 82/129, 118, 119, 82/120, 121, 133, 147, 143, 144, 905; 409/12, 15

[56] References Cited

U.S. PATENT DOCUMENTS

| | | | |
|---|---|---|---|
| 1,227,822 | 5/1917 | Oliver | 82/144 X |
| 2,512,008 | 6/1950 | Bickel | 82/144 X |
| 2,936,641 | 5/1960 | Voelkl . | |
| 3,176,553 | 4/1965 | Schubert . | |
| 3,364,788 | 1/1968 | Schubert . | |
| 3,403,585 | 10/1968 | Barkhurst . | |
| 3,618,433 | 11/1971 | Reinemuth et al. | 82/129 X |
| 3,864,994 | 2/1975 | White | 82/129 |
| 3,885,473 | 5/1975 | Stratienko . | |
| 4,253,359 | 3/1981 | Youden | 82/129 X |
| 4,267,495 | 5/1981 | Wilterdink . | |
| 4,329,096 | 5/1982 | Herscovici | 409/12 X |
| 4,527,244 | 7/1985 | Graham, Jr. et al. | 408/63 X |
| 4,779,318 | 10/1988 | Henderson . | |
| 4,942,650 | 7/1990 | Howarth | 82/129 X |
| 5,207,135 | 5/1993 | Babuder et al. . | |
| 5,273,497 | 12/1993 | Wallace | 475/207 |
| 5,660,077 | 8/1997 | Nekola . | |
| 5,676,030 | 10/1997 | Crudgington et al. . | |

FOREIGN PATENT DOCUMENTS

| | | |
|---|---|---|
| 1 906 502 | 10/1969 | Germany . |
| 17 77 465 B1 | 7/1979 | Germany . |
| 2 092 333 | 8/1982 | United Kingdom . |

OTHER PUBLICATIONS

Flyer for "AccuDrive™ Zero Backlash Worm Gearing," Cone Drive Textron.

*Primary Examiner*—Andrea L. Pitts
*Assistant Examiner*—Henry W. H. Tsai
*Attorney, Agent, or Firm*—Brooks & Kushman P.C.

[57] ABSTRACT

A retrofit for an electronically programmable, servo-controlled power feed and spindle drive system for controlling the spindle and cam shaft drive of an automatic screw machine. The automatic screw machine originally provides rotational power to the spindles of the cam shaft drive through a complex series of gears, shafts and clutch systems. The gears, shafts and clutch systems also provide synchronization between the rotation of the spindles and the rotation of the cam shaft drive. A retrofit of the automatic screw machine includes replacement of the complex series of gears, shafts and clutch systems with a variable speed drive motor, a chain drive system, an electronic encoder for monitoring the rotational speed of the spindle shaft, an electric servo motor for providing rotational power to the cam shaft drive and a central processing unit to synchronize the speeds of the variable speed motor and electric servo motor. The result is an automatic screw machine adapted with an electronic control system that requires minimum alteration or reconstruction of the original machine.

7 Claims, 6 Drawing Sheets

ELECTRONICALLY PROGRAMMABLE SERVO-CONTROLLED POWER FEED AND SPINDLE DRIVE SYSTEM FOR AN AUTOMATIC SCREW MACHINE

TECHNICAL FIELD

This invention relates to an electronically programmable servo-controlled power feed and spindle drive system for controlling the spindle and cam shaft drive of an automatic screw machine.

BACKGROUND ART

Automatic screw machines, and other multiple spindle machine tools, are well-known in the art. These machines have the capacity for producing high volumes of items, such as screws, bolts and pipe fittings efficiently and effectively.

Generally, multi-spindle screw machines consist of four to eight rotatable spindles equally spaced about a rotatable drum, or spindle carrier. Each spindle is equipped with a chuck for holding a workpiece in place during maching. Bar stock is fed through one end of the spindle to be formed into the workpiece. The spindle carrier rotatably indexes about a central axis positioning each spindle at a selected workstation. Each workstation consists of working tools attached to indexing cross and end slides. The slides are advanced until the working tools come into contact with the stock and are retracted after the work has been completed. After the tools from each station are retracted, the drum rotates the appropriate distance, depending upon the number of spindles, thus locating each spindle in the appropriate position for a sequential operation. A final tool slide is usually provided with a cutting tool which cuts the workpiece from the bar stock, completing the process that is then repeated.

In the past, automatic screw machines were equipped with a single power source normally referred to as a drive motor. The drive motor provided power to rotate each spindle, as well as the power for reciprocating the cross and end slides into the working and retracted positions. The drive motor provided power to the rest of the machine by driving a main shaft. A spindle shaft rotated each spindle at the appropriate speed and was driven by the main shaft through a set of high and low speed gears. These gears rotated a secondary shaft at either high or low speeds that in turn, rotated the spindle drive shaft at a high or low speed. A geartrain was used to transfer power from the secondary shaft to the spindle shaft.

The main shaft also provided power to the tool slides through a set of clutches, worm gears, shafts and geartrains. The clutch system was engaged or disengaged by a shaft rotated by a small worm gear, driven by a shaft connected by way of a geartrain to the spindle drive shaft. The clutch would engage or disengage depending upon whether the spindle shaft was rotating at a high or low speed, respectively. During low speed operation the tool contacted the workpiece and the slide indexed slowly along the length of the piece to ensure precision and reduce heat and tool wear. The high speed clutch indexed the tools into a machining position from their retracted position and back to the retracted position after the machining operation was completed. Retracting the tool slides allowed the spindle carrier to rotate and position each workpiece in the next workstation. This rapid indexing of the tool slides facilitates significant reduction in cycle time, thus allowing increased productivity.

Problems inherent in conventional automatic screw machines are due to their inflexibility. They cannot readily handle tasks which they are not precisely designed to perform. Such tasks may substantially change over time. Cost and time associated with maintenance and repair of the significant number of wearing parts also cannot readily.

Changing over a machine in the past to handle machining jobs other than what the machine was originally designed to accomplish tended to require extensive changes to the machine including changes to the high/low drive gears and clutch system, and could involve the drum shaft and several gear trains.

Other attempts have been made to integrate the existing designs with electronic control systems in an attempt to blend the utility of these machines with modern manufacturing processes. It has not been feasible to retrofit existing machines with comprehensive electronic controls due to the costs associated with such a retrofit.

SUMMARY OF THE INVENTION

Accordingly, the present invention realizes the benefits of adapting an existing multiple spindle automatic screw machine with an electronic control system while requiring minimal alteration or reconstruction of the existing machine. The invention includes the incorporation of a variable speed drive motor, a chain drive system, rotational speed encoders, electronically controlled servo motors, a worm gearing system and a central processing unit.

The chain drive system consists of two sprockets that are placed on the existing main shaft and spindle shaft, respectively. The sprockets are connected by a chain, thus allowing the elimination of the high and low speed gear change sets of existing automatic screw machines. A rotational speed encoder is used to monitor the speed of the main shaft and the spindle shaft.

An independent servo motor is used to rotate the drum shaft through the existing worm gearing, thus allowing the removal of the entire clutch system, as well as the geartrain between the main shaft and the clutch system. The speed of the servo motor is monitored and can be calibrated with the speed of the main shaft as recorded by the encoder ensuring proper timing of the drum shaft and the slide travel with the indexing of the spindle carrier.

It is an object of this invention to provide an apparatus for simply and effectively retrofitting an existing multiple spindle automatic screw machine with more recently developed electronic control mechanisms.

It is another object of this invention to provide an apparatus for a multiple spindle automatic screw machine including a variable speed drive motor to provide rotational power to the main shaft.

It is another object of this invention to provide an apparatus for a multiple spindle automatic screw machine including an encoder, that is directly attached to the main shaft for monitoring the rotational speed of the main shaft and providing this information to the central processing unit.

It is another object of this invention to provide an apparatus for a multiple spindle automatic screw machine that includes a servo motor for providing rotational power to the drum shaft through the existing mechanical linkages.

It is another object of this invention to provide an apparatus for a multiple spindle automatic screw machine wherein the speed of the variable speed drive motor and the speed of the servo motor are controlled by the controller so as to allow calibration between the slow and high speed indexing of the machining tools with the indexing of the spindle carrier, thus eliminating the need for the clutch system, the high/low speed gearing from the main shaft, and any and all linkages or gearing used to communicate the speed of the spindle shaft with the clutch.

It is another object of the present invention to provide an apparatus for a multiple spindle automatic screw machine wherein the apparatus includes a worm gearing assembly which provides a sufficient gear ratio so as to reduce the rotational speed at which the electric servo motor unit operates while providing sufficient power to rotate the drum. The worm gearing assembly provides inertial dampening reducing the load on the electric servo motor.

Other objects of the invention are disclosed in the following description of the best mode of the invention.

The structural and functional characteristics of the present invention and its advantages over the known prior art will become more apparent from the following description that refers to the appended drawings of the preferred embodiment based on the principles of the invention.

BEST MODE FOR CARRYING OUT THE INVENTION

Figure 1:
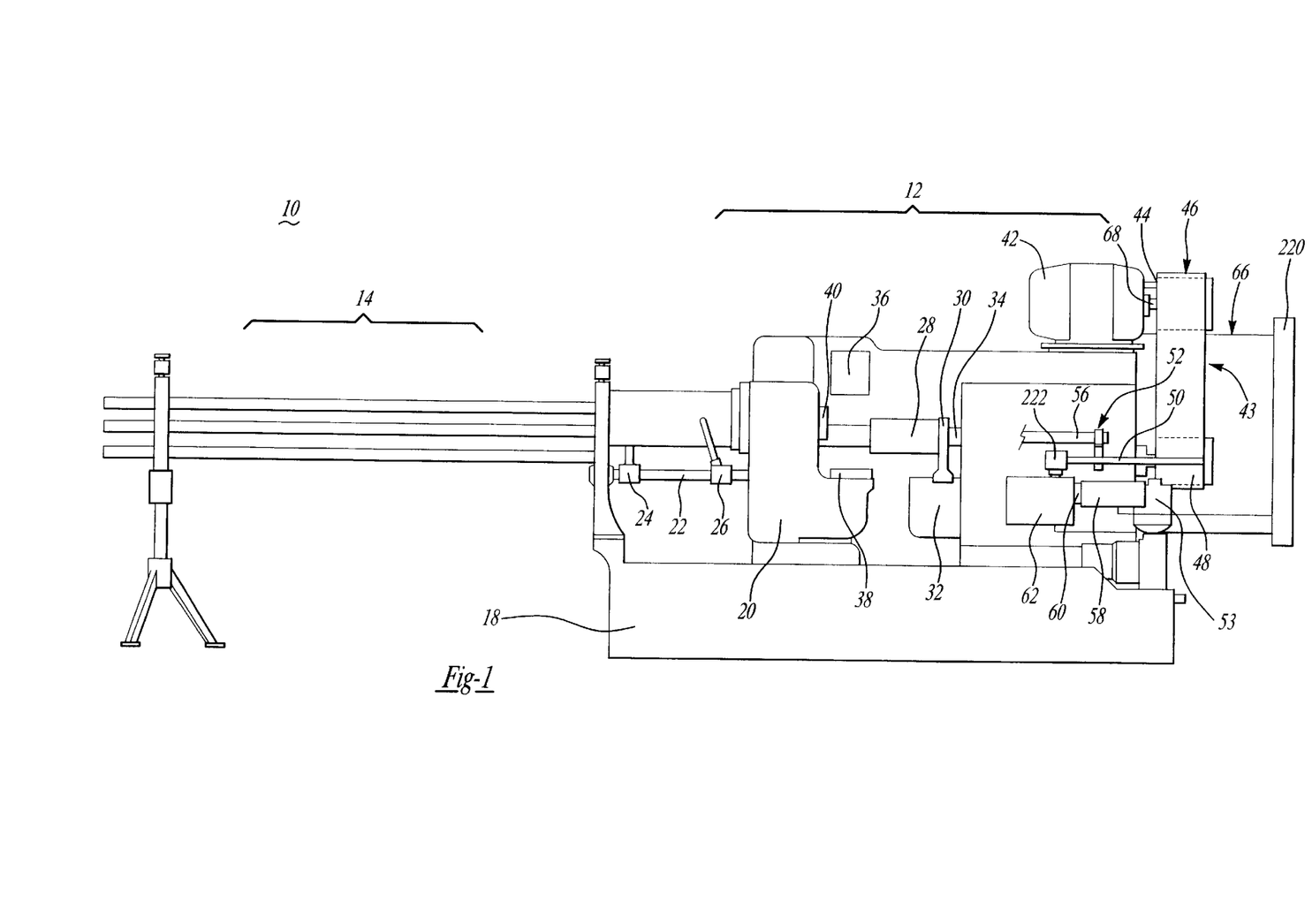
FIG. 1 is a side elevation view of an electronically programmable servo controlled power feed and spindle drive system of the present invention in conjunction with a multiple spindle automatic screw machine.

Referring now to FIG. 1, a multiple spindle screw machine system, generally indicated by reference numeral 10, is shown consisting of a multiple spindle automatic screw machine 12 and a bar stock feeder assembly 14. The screw machine 12 includes a main base 18, a head stock 20, a stock feed guide shaft 22, a stock feed slide 24, a hand chucking slide 26, a main tool slide 28, a main slide guide 30, a main slide guide support 32, a stem 34, an upper cross slide 36, a lower cross slide 38 and a cut-off slide 40.

Figure 2:
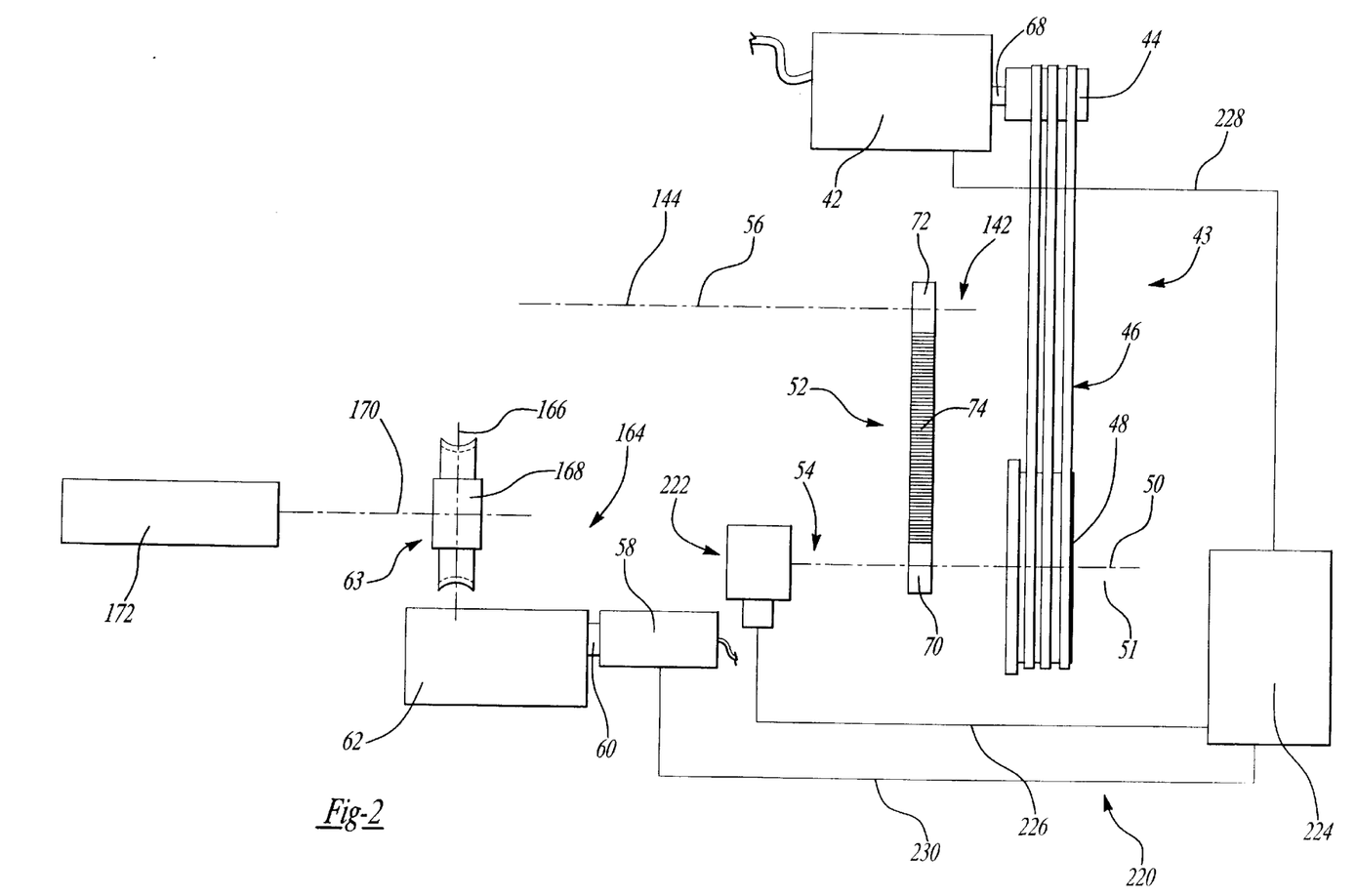
FIG. 2 is a schematic showing the present invention in conjunction with a multiple spindle automatic screw machine.

Referring now to FIGS. 1 and 2, the screw machine 12 further includes a drive motor 42 of variable speed, a pulley system 43, a main shaft 50, a chain drive system 52, a spindle shaft 56, a cam drive system 164 and a pump 53 for providing recirculating lubrication and coolant to a worm gear assembly 63.

Power generated by the drive motor 42 is transferred to the main shaft 50 by the pulley system 43. The drive motor 42 is provided with a power output shaft 68. The pulley system 43 includes a motor pulley 44, a plurality of drive belts 46 and a drive pulley 48. The motor pulley 44 is attached to the power output shaft 68 of the drive motor 42. The drive pulley 48 is attached to the main shaft 50. The drive belts 46 are entrained about the motor pulley 44 and the drive pulley 48, whereby substantially no slippage occurs between the drive belts 46 and the pulleys 44 and 48.

Figure 3:
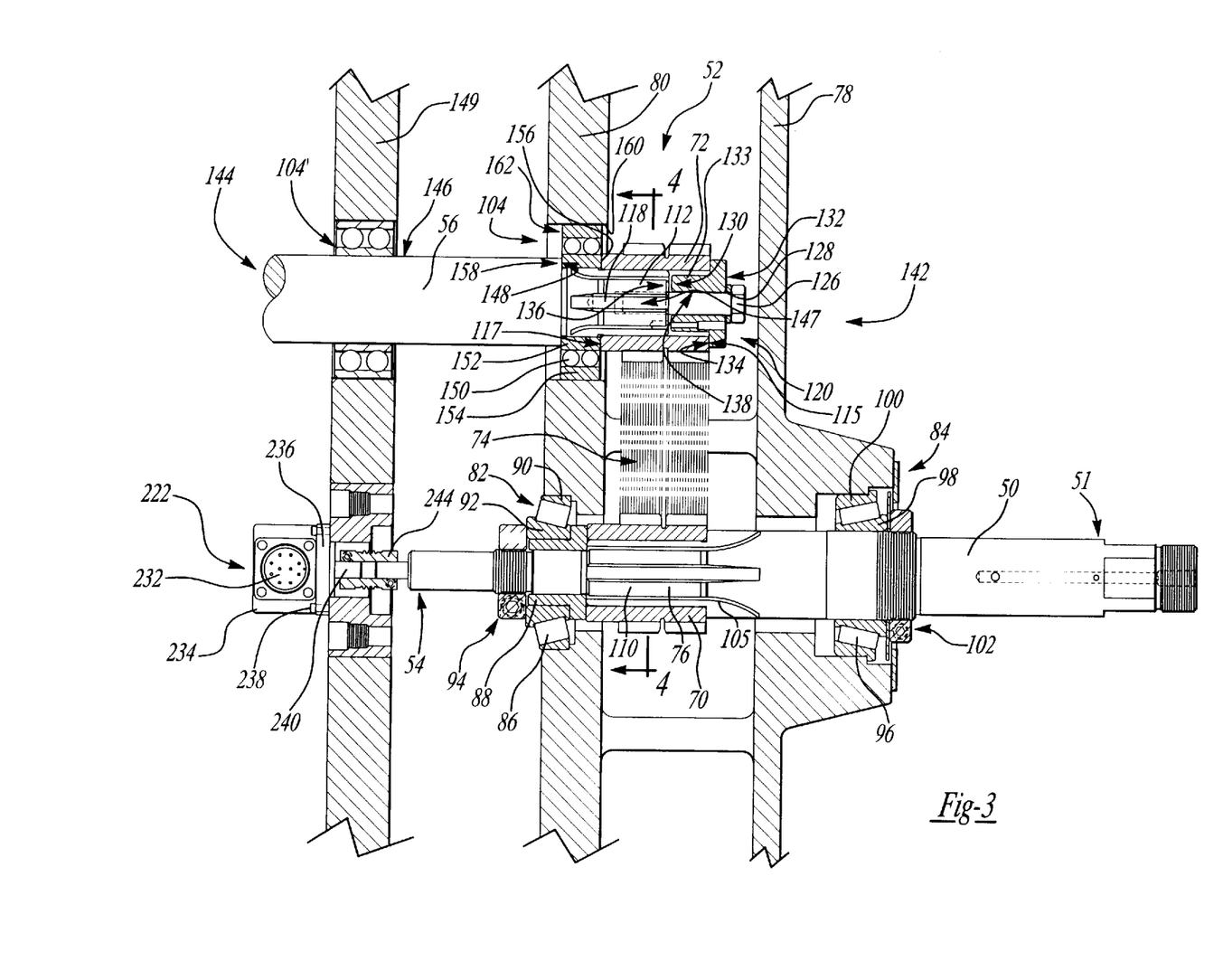
FIG. 3 is a side elevation view of a chain drive assembly of the present invention.
Figure 4:
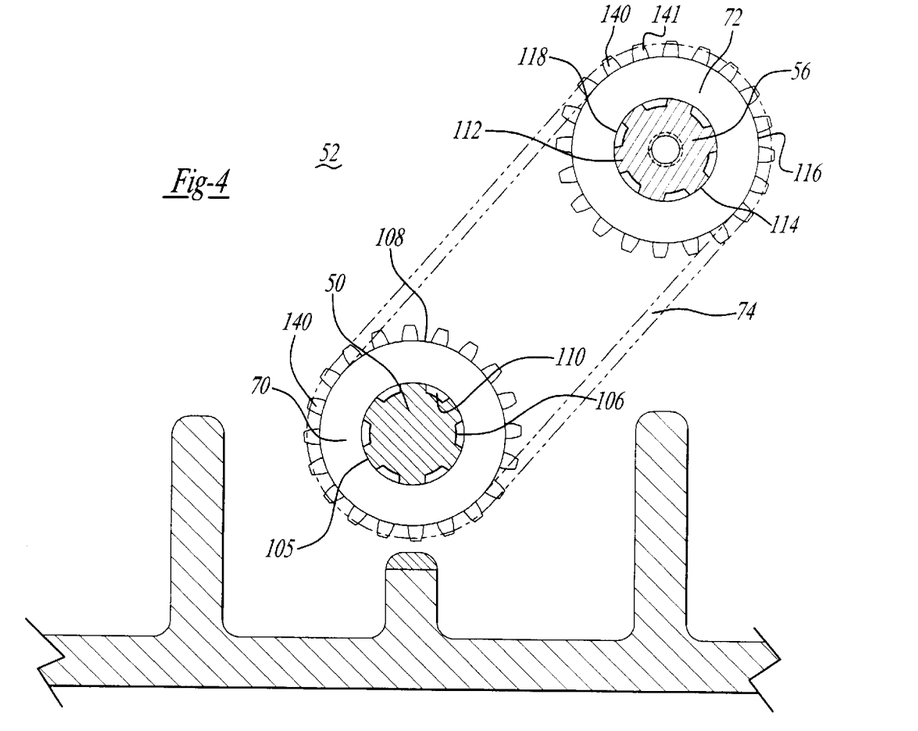
FIG. 4 is a sectional view of the chain drive assembly of the present invention.

Referring to FIGS. 1–4, and to FIGS. 3 and 4 in particular, the main shaft 50 is provided with a proximal end 51 and a distal end 54. Main shaft 50 is provided with a set of longitudinal splines 105 positioned equally about the circumference and for a portion of the length of the main shaft 50. The main shaft 50 is rotatably journaled within a first machine wall 78 and a second machine wall 80 by a forward bearing assembly 82 and a rearward bearing assembly 84, respectively. The forward bearing assembly 82 includes bearings 86, a bearing spacer 88, an outer race 90, an inner race 92 and a spanner adjustment nut assembly 94. The rearward bearing assembly 84 includes bearings 96, a bearing spacer 98, an outer race 100 and an adjustment nut assembly 102.

Spindle shaft 56 is offset relative to the main shaft 50 in a substantially parallel manner. Spindle shaft 56 is provided with a proximal end 142, a distal end 144 and an outer surface 146. The proximal end 142 of the spindle shaft 56 is provided with a set of longitudinal splines 112 positioned equally about the circumference and extending for a portion of the length of the spindle shaft 56. The proximal end 142 of the spindle shaft 56 is further provided with a step 148 and an end wall 130. Step 148 is orthogonal to the length of the spindle shaft 56 and extends inwardly from the outer surface 146. The proximal end 142 of the spindle shaft 56 is also provided with a threaded center bore 147 centrally located within end wall 130 and extending into spindle shaft 56.

Spindle shaft 56 is rotatably journaled within second machine wall 80 by a bearing assembly 104. Bearing assembly 104 includes bearings 150, an inner race 152 and an outer race 154. The inner race 152 is defined by a first wall 156 and a second wall 158. Outer race 154 is defined by a first wall 160 and a second wall 162. Spindle shaft 56 is positioned within the bearing assembly 104 such that the second wall 158 of the inner race 152 is in substantial contact with the step 148 of the spindle shaft 56. A corresponding bearing assembly 104', spaced from bearing 104, journals shaft 56 in a third machine wall 149.

Main shaft 50 transfers power to the spindle shaft 56 through the chain drive system 52. Chain drive system 52 includes a main shaft sprocket 70, a spindle shaft sprocket 72 and a drive chain 74. The main shaft sprocket 70 has inner spline teeth with an addendum 106 and outer sprocket teeth with a dedendum 108. The inner spline teeth of the main shaft sprocket 70 drivably engage splines 105 of the main shaft 50.

Spindle shaft sprocket 72 has internal spline teeth 112 with a dedendum 114, and external sprocket teeth with a dedendum 116, a first end surface 115 and a second end surface 117. The spindle shaft sprocket 72 is positioned about the spindle shaft 56 such that external spline teeth of the spindle shaft 56 with an addendum 118 drivably engage the spline teeth 112 of the spindle shaft sprocket 72.

Spindle shaft sprocket 72 is held in position by a washer spring assembly 132. Washer spring assembly 132 includes a retaining washer 122, a hex bolt 126 and a helical spring lock washer 128. Retaining washer 122 is defined by a first section 151, a second section 133, a seat shoulder 134, a second surface 136 and a center bore 138. The washer spring assembly 132 is assembled with the spindle shaft 56 and the spindle shaft sprocket 72 such that the second section 133 of the retaining washer 122 is seated within the inner circumference 114 of the spindle shaft sprocket 72. The seat shoulder 134 of the retaining washer 122 is in substantial contact with the first surface 115 of the spindle shaft sprocket 72. The second surface 117 of the spindle shaft sprocket 72 is in substantial contact with the first wall 156 of the inner race 152 of the bearing assembly 104. Retaining washer 122 is held in position by the hex bolt 126 which is threaded into the threaded central bore 147 of the spindle shaft 56. Hex bolt 126 is locked into position by the spring lock washer 128.

The main shaft sprocket 70 and the spindle shaft sprocket 72 are provided with a plurality of equally spaced gear teeth 140 and 141 respectively. Drive chain 74 meshes with the spacing of the gear teeth 140 and 141 of the main shaft sprocket 70 and the spindle shaft sprocket 72. Drive chain 74 links main drive shaft 50 to spindle shaft 56 for uniform driving rotation of the main shaft 50 and the spindle drive 56.

The chain drive system 52 replaces the high/low speed gearing, secondary spindle shaft and gear train used in the prior art to transfer power from the main shaft 50 to the spindle shaft 56. Adapting existing automatic screw machines for the chain drive system 52 may be done by reworking the existing main shaft 50 and spindle shaft 56. While the chain drive system 52 has been used to transfer power from the main shaft 50 to the spindle shaft 56, it is foreseeable that other means may be utilized.

Figure 5:
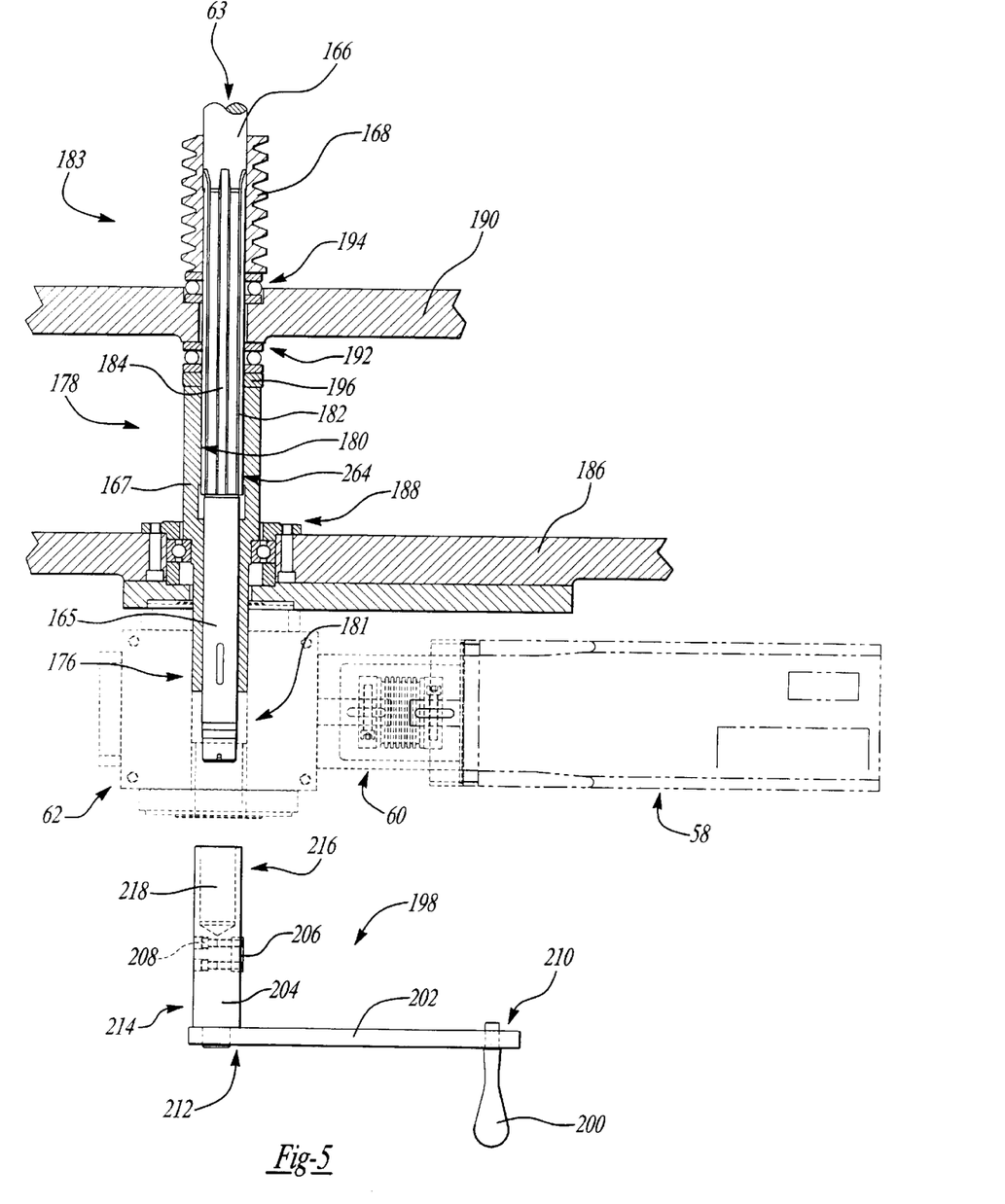
FIG. 5 is a sectional view of the servo controlled power feed assembly of the present invention.
Figure 6:
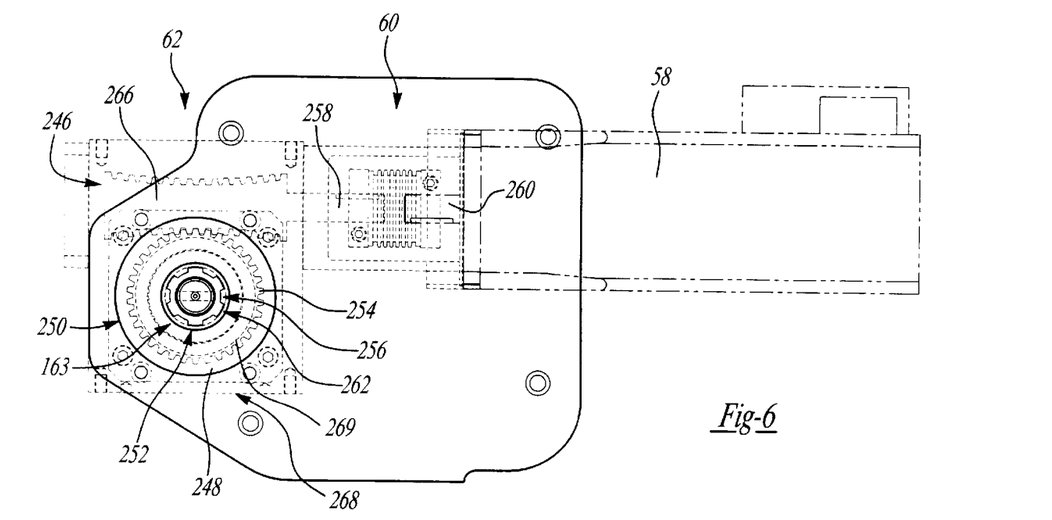
FIG. 6 is a cross-sectional view of the cone gear assembly of the servo-drive power feed assembly of the present invention.

Referring now to FIGS. 1, 2, 5 and 6, and to FIGS. 5 and 6 in particular, the screw machine 12 is provided with a cam drive system 164 which is electronically controlled. The cam drive system 164 includes a servo motor 58, the worm gear assembly 62, a worm shaft assembly 163, a coupling 60, a drum shaft 170 and a drum 172. The drum 172 rotates to control the movement of several components, including the stock feed slide 24, the tool slide 28, the upper cross slide 36, the lower cross slide 38 and the cut-off slide 40.

The servo motor 58 provides power to the drum 172. The size of the servo motor used may vary according to the particular application.

Servo motor 58 drives the rotation of the worm shaft assembly 163 by way of the coupling 60 and the worm gear assembly 62. Servo motor 58 is provided with a power shaft 260.

Worm gear assembly 62, more specifically referred to as a 900° angle drive, zero backlash, whisper drive worm gear reducer, includes a driven gear 248 and a worm gear 246. The driven gear 248 has an inner surface 252 and an outer surface 250. The inner surface 252 is provided with a set of evenly spaced splines 256. The outer surface 250 of the driven gear 248 is provided with a set of gear teeth 254.

The worm gear assembly is provided with a zero backlash worm gear 266, such as the AccuDrive™ Zero Backlash Worm Gearing manufactured by Textron Incorporated. A shank 258 extends from the worm gear 266 and is connected to the power shaft 260 of the servo motor 58 by coupling 60. Worm gear 246 and the driven gear 248 are positioned within the worm gear assembly 62 such that the zero backlash worm gear 266 is in substantial contact with the gear teeth 254 of the driven gear 248. The ratio of the gear system is 3.6:1. This ratio allows the servo motor to rotate at a relatively high rotational speed while generating a greater amount of inertia and reducing the load on the servo motor.

The worm shaft assembly 163 includes an adaptor coupling 167, a worm shaft 166 and a worm gear 168. The adaptor coupling 167 is defined by a proximal end 176, a distal end 178 a longitudinal bore 180 and an exterior surface 264. The exterior surface 264 of adaptor coupling 167 is provided with a set of longitudinal splines 262 extending along a portion of the proximal end 176. The driven gear 248 is positioned about the worm shaft assembly 163 with the splines 256 of the driven gear 248 mated with splines 262 of the adaptor coupling 167.

The longitudinal bore 180 is provided with a set of longitudinally oriented splines 182 equally spaced about the circumference of the longitudinal bore 180. Worm shaft 166 is defined by a proximal end 181 and a distal end 183. Worm shaft 166 is provided with longitudinally oriented splines 184 equally spaced about the proximal end 181 and has the worm gear 168 on the distal end 183. The extension coupling 167 is coupled with the worm shaft 166 such that the splines 182 of the extension coupling 167 are mated with the splines 184 of the worm shaft 166. Although slip-fits and spline connectors have been utilized in the current design, it is foreseeable to use other methods of connection, including, but not limited to, welding or forming the components of any particular shaft assembly from a single, continuous piece.

The worm shaft assembly 163 is journaled within a fourth machine wall 186 by a pressure bearing 188 and within a fifth machine wall 190 by a pressure bearing 192 and a pressure bearing 194. A worm gear spacer 196 is positioned about the worm shaft 166 and is situated between the extension coupling 167 and the pressure bearing 192.

Figure 7:
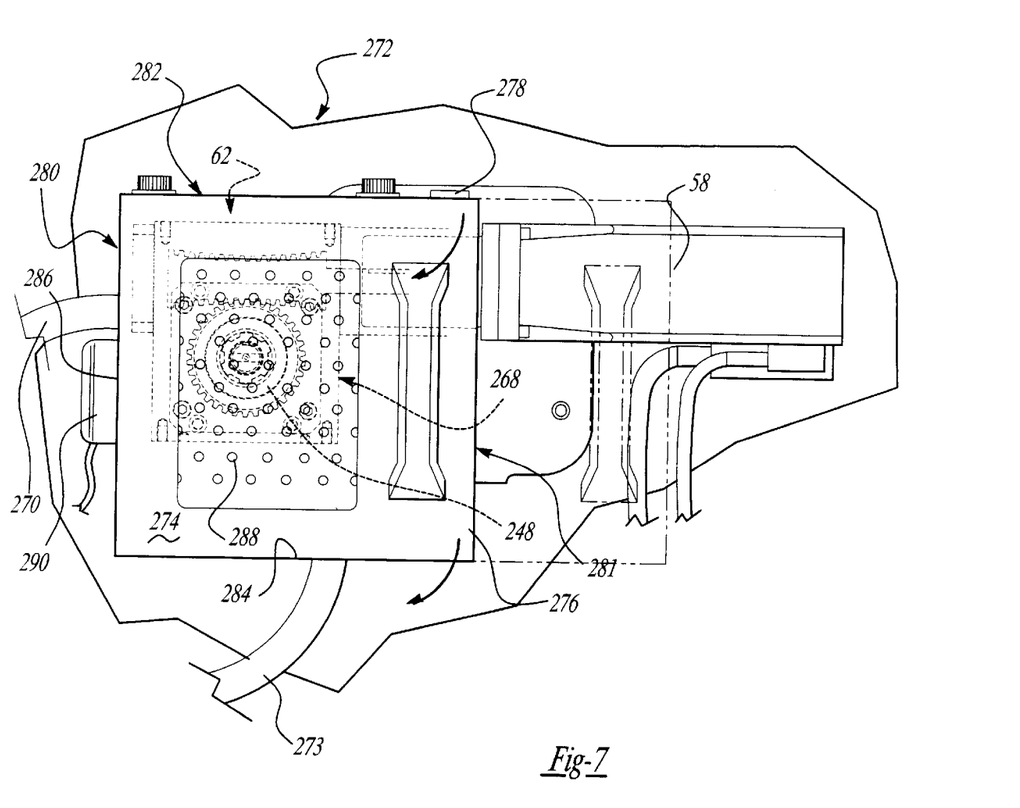
FIG. 7 is a partially cut-away view of the worm gear assembly and electric servo motor of the present invention.

Referring to FIGS. 6 and 7, worm gear assembly 62 is enclosed within a housing 268. Housing 268 encloses the worm gear assembly 62 so that lubricating fluids supplied to the worm gear assembly 62 will be captured and recirculated through a heat exchanger (not shown) to the pump 53.

Housing 268 is provided with an aperture 269 such that an operator can adapt the hand crank assembly 198 to the shaft extension 165 of the worm shaft assembly 163 so as to manually index components of the automatic screw machine 12.

Lubricating fluids are supplied to the housing 268 by the pump 53 through a first coolant line 270 which is in fluid communication between the pump 53 and the housing 268. A second coolant line 273 is in fluid communication between the housing 268 and the heat exchanger (not shown).

A shroud assembly 272 is placed over the worm gear assembly 62. The shroud assembly 272 includes a shroud casing 274, a sliding door 276 and a safety switch 278. The shroud assembly 272 is box-like in structure and is defined by a left wall 280, a right wall 281, an upper wall 282, a front aperture 284 and a back aperture (not shown).

Shroud casing 272 is located over the gear assembly 62 and the housing 268. The sliding door 276 is slidably attached to the shroud casing 274 such that when in a closed position the sliding door 276 is located over the front aperture 284 and when in an open position is located so as to allow access to the housing 268. The sliding door 276 is provided with a plurality of holes 288.

A cooling fan 290 is used to help reduce the operating temperature of the worm gear assembly 62. The left wall 280 is provided with an aperture 286. The cooling fan 290 is attached to the left wall 280 so that the cooling fan 290 may draw air through the aperture 286. Cooling fan 290 functions to draw air through the shroud casing 272. Air is drawn through the aperture 286 and exits through the holes 288 provided in the sliding door 276.

Safety switch 278 is attached to the upper wall 282 of the shroud casing such that when sliding door 276 is in an open position the safety switch 278 cuts off all power from the automatic screw machine 12.

Referring to FIG. 5, a hand crank assembly 198 is shown. The hand crank assembly 198 may be used by an operator to manually rotate the drum 172 to selectively index any or all tool slides including the main tool slide 28, the upper cross slide 36, the lower cross slide 38 and the cut-off slide 40. The selective indexing is useful to the operator during set-up, or calibration, and maintenance. Hand crank assembly 198 includes a crank handle 200, a crank lever 202, a hand crank hub 204, a hand crank key 206 and key screws 208. The hand crank lever 202 is defined by a proximal end 210 and a distal end 212. Hand crank hub 204 is defined by a proximal end 214 and a distal end 216. The distal end 216 of the hand crank hub 204 is provided with a bore 218 partially extending into the hand crank hub 204. The hand crank lever 202 is attached to the crank handle 200 at the proximal end 210 and to the hand crank hub 204 at the distal end 212.

The hand crank key 206 is attached to the hand crank hub 204 by key screws 208. Hand crank hub 204 engages the proximal end 174 of the extension shaft 165. Hand crank key 206 engages the splines 262 of the driven gear 248 thereby allowing the operator to manually index the main tool slide 28, upper cross slide 36, lower cross slide 38 and cut-off slide 40.

Worm gear assembly 62 allows the servo motor to be placed at a 90° angle from the worm shaft assembly, thereby allowing the adaptation of the hand crank assembly 198 to the cone gear assembly 62. This orientation of the cone gear assembly 62 also reduces floor space requirements.

Referring now to FIGS. 1, 2, 3 and 5, and to FIG. 2 in particular, the screw machine 12 is provided with an electronically programmable control system 220. The control system 220 includes a digital encoder assembly 222, a central processing unit 224 and a first, second and third set of data transmission lines 226, 228 and 230, respectively.

Digital encoder assembly 222 includes a digital encoder 232, a head cap 234, a mounting cap 236, head cap mounting screws 238 and encoder shaft 240. The head cap 234 encases and protects the digital encoder 232 so that the digital encoder 232 may be used within the inside of the machine where it is subject to submersion in lubricating fluids. The mounting cap 236 provides a sufficient mounting surface and adaptation for the head cap 234 to be secured to the third machine wall 149 by the head cap mounting screws 238. A coupling 244 is used to couple the rotation of the encoder shaft 240 to the rotation of the main shaft 50.

The first set of data transmission lines 226 provide electronic communication between the digital encoder 232 and the central processing unit 224. The digital encoder 232 monitors the speed of the main shaft 50 and, therefore, monitors the speed of the spindle shaft 56 as a result of the direct drive mechanical linkage provided by the chain drive system 52.

The second set of data transmission lines 228 provide electronic communication between the drive motor 42 and the central processing unit 224. The central processing unit 224 controls the speed of the variable speed drive motor 42 in order to optimize the rotational speed of the spindle shaft 56 and the workpiece for various machining functions and types of stock.

The ratio between the motor pulley 44 and the drive pulley 48 in the current application is 1:1. However, it is foreseeable that in certain situations a different pulley ratio may be desired. By coupling the digital encoder 232 to the main shaft 50, changes to the pulley ratio may be accomplished without requiring complex calculations to determine the rotational speed of the spindle shaft 56. If the digital encoder 232 is placed in a position to monitor the speed of the drive motor 42, calibration of the central controller 224 would be required to accommodate modifications of the gear ratio.

Locating the digital encoder assembly 222 in the location previously discussed allows an existing automatic screw machine to be retrofitted with electronic control systems with no modification to the main structure, shields or other structural components associated of existing automatic screw machines.

The third set of data transmission lines 230 provides electronic communication between the servo motor 58 and the central processing unit 224. By controlling the rotational speed of the servo motor 58, the controller 224 controls the rotational speed of the drum 172.

The central processing unit 224 may be used to precisely control the speed of the spindle shaft 56, as well as the rotation of the drum 172, thereby allowing the central processing unit 224 to control the spindle drive system and the tool feed system at their optimum level of efficiency. The central processing unit 224 may also operate the spindle drive system and the tool slide system in an integrated manner, thereby optimizing cycle time, increasing productivity and reducing costs.

While this invention has been described in detail with particular reference to preferred embodiments thereof, it should be understood that variations and modifications can be effected within the broad scope of the invention as defined in the appended claims.

What is claimed is:

1. An apparatus for providing rotational power to a set of sipindles and to a cam drive system of a multiple spindle automatic screw machine, the apparatus comprising:

a variable speed drive motor and a separate servo motor;

a central processing unit connected to the variable speed motor and to the servo motor for independently controlling the speed of each motor;

a main shaft receiving rotational power from the drive motor trough a first continuous power loop and having a speed of rotation that is a function of the speed of the variable speed motor;

a spindle shaft providing rotational power to the spindles, the servo motor being drivably connected to the cam drive system; and a second continuous power loop communicating power from the main shaft to the spindle shaft;

the second continuous loop being a chain drive system having a first sprocket attached to the main shaft, a second sprocket attached to the spindle shaft and a chain in mechanical communication between the first sprocket and the second sprocket such that the speed of rotation of the main shaft relative to the spindle shaft remains constant.

2. An apparatus for electronically controlling a set of rotatable spindles and a cam drive system of an automatic screw machine whereby the spindles have a controlled speed of rotation, the apparatus comprising:

a variable speed drive motor and a separate servo motor, the servo motor being drivably connected to the cam drive system;

a main shaft receiving rotational power from the drive motor through a first continuous power loop and having a speed of rotation that is a function of the speed of the variable speed motor;

a spindle shaft providing rotational power to the set of spindles;

a second continuous power loop communicating power from the main shaft to the spindle shaft;

a central processing unit;

an encoder converting mechanical rotational motion into an electronic signal, the encoder monitoring the rotation speed of the spindle shaft;

a first electrical transmission line providing electronic communication between the variable speed drive motor and the central processing unit;

a second electrical transmission line providing electronic data communication between the encoder and the central processing unit;

a third electrical transmission line between the servo motor and the central processing unit; and the central procssing unit optimizing the rotation of the spindle shaft by monitoring the rotational speed of the spindle shaft and controlling separately the speed of the variable speed drive motor and the servo motor;

the second continuous power loop being a chain drive system having a first sprocket attached to the main shaft, a second sprocket attached to the spindle shaft and a chain in mechanical communication between the first sprocket and the second sprocket such that the speed of rotation of the spindle shaft relative to the speed of rotation of the main shaft remains constant.

3. The apparatus of claim 2 wherein the encoder is located in the automatic screw machine and is mechanically coupled to the main shaft.

4. An apparatus for electronically controlling a spindle and a cam drive system of an automatic screw machine whereby the spindle has a controlled speed of rotation, the apparatus comprising:

a variable speed drive motor and a servo motor;

a main shaft receiving rotational power from the drive motor through a continuous power loop whereby it is driven at a controlled speed of rotation;

a spindle shaft providing rotational power to the spindle;

the servo motor being drivably connected to the cam drive system:

a chain drive system communicating power from the main shaft to the spindle shaft, the chain drive system having a first sprocket attached to the main shaft, a second sprocket attached to the spindle shaft and a chain providing mechanical communication therebetween such that the speed of rotation of the spindle shaft relative to the speed of rotation of the main shaft remains constant;

a central processing unit;

an encoder relating mechanical rotational motion into an electronic signal, the encoder located on the interior of the automatic screw machine and mechanically coupled to the main shaft;

a first electrical transmission line providing electronic communication between the variable speed drive motor and the central processing unit;

a second electrical transmission line providing electronic data communication between the encoder and the central processing unit;

a third electrical transmission line between the servo motor and the central processing unit;

whereby the central processing unit receives data from the encoder and monitors the rotational speed of the main shaft, the speed of the variable speed motor and the speed of the servo motor thereby being controlled by the central processing unit to effect predetermined speeds of the spindle shaft and the servo motor.

5. An apparatus for electronically controlling a rotating spindle and an automatic screw machine having a tool feed, the apparatus comprising:

a variable speed drive motor for developing rotational power;

a main shaft receiving rotational power from the drive motor through a continuous power loop and driven at a controlled speed of rotation;

a spindle shaft providing rotational power to a set of spindles, the spindle shaft having a controlled speed of rotation;

a chain drive system communicating power from the main shaft to the spindle shaft, the chain drive system having a first sprocket attached to the motor shaft, a second sprocket attached to the spindle shaft and a chain providing mechanical communication therebetween such that the speed of rotation of the spindle shaft relative to the speed of rotation of the main shaft remains constant;

a central processing unit;

an encoder converting mechanical rotational motion into an electronic signal; the encoder being located in the interior of the automatic screw machine and mechanically coupled to the mainshaft;

an electric servo motor for developing rotational power;

a worm gear assembly;

a coupling between the electric servo motor and the worm gear assembly;

a worm shaft assembly driven by the worm gear assembly, the worm gear assembly being used to transfer the rotational power of the servo motor 90° to the worm shaft assembly;

a drum shaft driven by the worm shaft assembly;

a drum driven by the drum shaft;

a set of tool slides indexed by the drum;

a first electrical transmission line providing electronic communication between the variable speed drive motor and the central processing unit;

a second electrical transmission line providing electronic data communication between the encoder and the central processing unit;

a third electrical transmission line providing electronic communication between the electric servo motor and the central processing unit;

whereby the central processing unit receives data from the encoder and monitors the rotational speed of the main shaft the speed of the variable speed motor thereby being controlled by the central processing unit to effect predetermined speeds of the spindle shaft;

the central processing unit independently controlling the operation of the electric servo motor and synchronizing the operation of the set of tool slides with the rotational speed of the spindle shaft.

6. A retrofit for an automatic screw machine originally having a drive motor connected with a continuous power loop to a main shaft that is connected to a spindle shaft through a multi-speed gear set, a secondary shaft and a gear train, the secondary shaft being connected to a set of tool slides through a set of beveled gears, a clutch system, a large worm gear set, a drum shaft and a drum, the clutch system being connected to the spindle shaft by a small worm gear set, the drive motor, multi-speed gear set, secondary shaft, gear train, beveled gears, clutch system, large worm gear set and small worm gear set being replaced by:

a variable speed drive motor;

a first continuous power loop communicating power from the variable speed drive motor to the main shaft;

a second continuous power loop communicating power from the main shaft to the spindle shaft;

the spindle shaft and the main shaft each having a controlled speed of rotation;

an encoder converting mechanical rotational motion into an electronic signal, the encoder being located on the interior of the automatic screw machine and being mechanically coupled to an end of the main shaft;

electric servo motor;

a worm gear assembly;

a coupling between the electric servo motor and the worm gear assembly;

a worm shaft, assembly driven by the worm gear assembly, the worm gear assembly being used to transfer the rotational power of the servo motor 90° degrees to the worm shaft assembly;

a central processing unit;

a first electrical transmission line providing electronic communication between the variable speed drive motor and the central processing unit;

a second electrical transmission line providing electronic data communication between the encoder and the central processing unit; and a third electrical transmission line providing electronic communication between the electric servo motor and the central processing unit;

whereby the central processing unit receives data from the encoder and monitors the rotational speed of the main shaft, the speed of the variable speed motor and the speed of the servo motor thereby being controlled by the central processing unit to effect predetermined speeds of the spindle shaft;

the central processing unit independently controlling the operation of the electric servo motor and synchronizing the operation of the set of tool slides with the rotational speed of the spindle shaft;

the second continuous loop being a chain drive system having a first sprocket attached to the main shaft, a second sprocket attached to the spindle shaft and a chain in mechanical communication between the first sprocket and the second sprocket such that the speed of rotation of the spindle shaft relative to the speed of rotation of the main shaft remains constant.

7. A retrofit for an automatic screw machine originally having a drive motor connected with a continuous power loop to a main shaft that is connected to a spindle shaft through a multi-speed gear set, a secondary shaft and a gear train, the shaft being further connected to a set of tool slides through a set of beveled gears, a clutch system, a large worm gear set, a drum shaft and a drum, the clutch system being connected to the spindle shaft by a small worm gear set, the drive motor, multi-speed gear set, secondary shaft, gear train, beveled gears, clutch system, large worm gear set and small worm gear set being replaced by:

a variable speed drive motor;

a first continuous power loop communicating power from the variable speed drive motor to the main shaft;

the spindle shaft and the main shaft each having a controlled speed of rotation;

a chain drive system having a first sprocket attached to the main shaft, a second sprocket attached to the spindle shaft and a chain in mechanical communication between the first sprocket and the second sprocket such that the speed of rotation of the second sprocket relative to the speed of rotation of the first sprocket remains constant;

a second continuous power loop communicating power from the main shaft to the spindle shaft;

an encoder converting mechanical rotational motion into an electronic signal, the encoder being located on the interior of the automatic screw machine and being mechanically coupled to an end of the main shaft;

an electric servo motor;

a worm gear assembly;

a coupling between the electric servo motor and the worm gear assembly;

a worm shaft assembly driven by the worm gear assembly, the worm gear assembly being used to transfer rotational power of the servo motor 90° degrees to the worm gear assembly;

a central processing unit;

a first electrical transmission line providing electronic communication between the variable speed drive motor and the central processing unit;

a second electrical transmission line providing electronic data communication between the encoder and the central processing unit;

a third electrical transmission line providing electronic data communication between the electric servo motor and the central processing unit;

whereby the central processing unit receives data from the encoder and monitors the rotational speed of the main shaft the speed of the variable speed motor and the speed of the servo motor thereby being controlled by the central processing unit to effect predetermined speeds of the spindle shaft;

the central processing unit independently controlling the operation of the electric servo motor and synchronizing the operation of the set of tool slides with the rotational speed of the spindle shaft.

* * * * *